United States Patent

[11] 3,527,212

[72] Inventor Wesley D. Clark
 877 W. Fremont Ave., Sunnyvale, California 94087
[21] Appl. No. 667,486
[22] Filed Sept. 13, 1967
[45] Patented Sept. 8, 1970

[54] DISPOSABLE NEEDLELESS HYPODERMIC INJECTOR
9 Claims, 3 Drawing Figs.

[52] U.S. Cl. .................................................. 128/173,
 128/215
[51] Int. Cl. ............................................. A61m 5/30,
 A61m 5/00
[50] Field of Search .................................. 128/173,
 173(H), 215, 216, 218, 218(U), 218.1, 218.2, 225;
 (Proj. Dig.) (P.I. Dig.) 222/80, 85, 86, 394;
 239/22, 272, 273, 364

[56] References Cited
UNITED STATES PATENTS

| | | | |
|---|---|---|---|
| 2,322,245 | 6/1943 | Lockhart | 128/173(H)UX |
| 2,547,099 | 4/1951 | Smoot | 128/173(H)UX |
| 2,645,223 | 7/1953 | Lawshe et al. | 128/173(H)UX |
| 2,655,919 | 10/1953 | Goodstein et al. | 128/218(.1)UX |
| 2,753,866 | 7/1956 | Koree | 128/216 |
| 2,936,756 | 5/1960 | Gabriel | 128/218(.1)UX |
| 3,115,133 | 12/1963 | Morando | 128/173(H)UX |
| 3,308,820 | 3/1967 | Hubbard | 128/216 |

FOREIGN PATENTS

| 959,294 | 9/1949 | France | 128/216 |
|---|---|---|---|

*Primary Examiner*—Richard A. Gaudet
*Assistant Examiner*—John B. Mitchell
*Attorney*—Harvey G. Lowhurst ABSTRACT: A needleless disposable hypodermic injector having a medicant containing ampule wherein the medicant is mixed with a high pressure propellant for injection into the body.

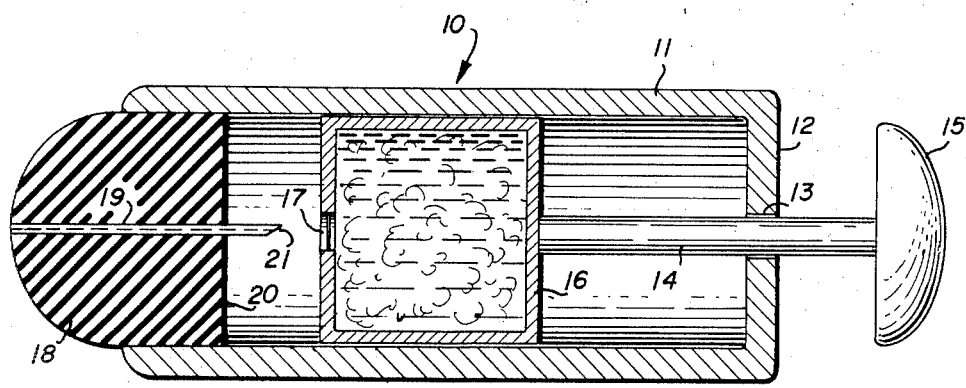
Fig_1
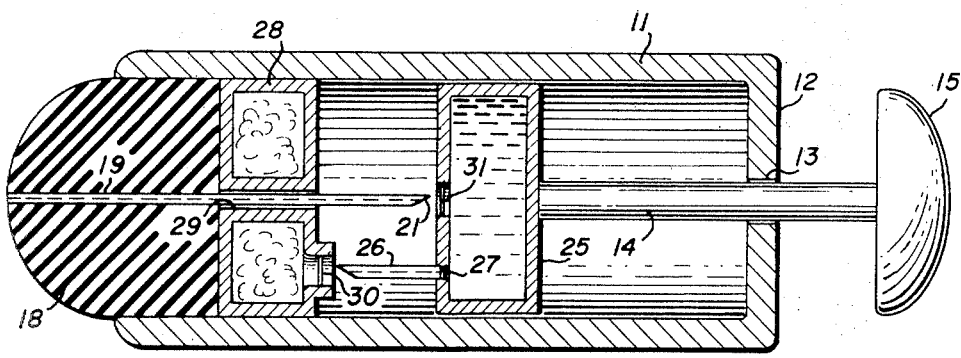
Fig_2
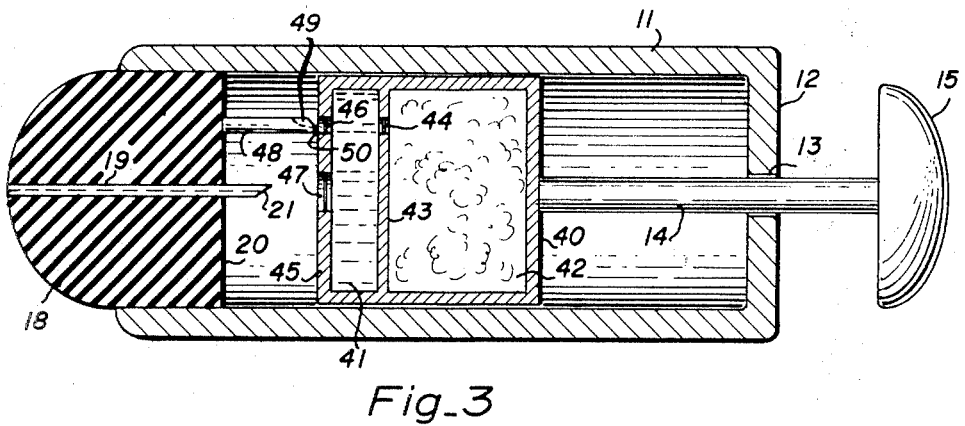
Fig_3

3,527,212

DISPOSABLE NEEDLELESS HYPODERMIC INJECTOR

BACKGROUND OF THE INVENTION

1. Field of the Invention

The present invention relates generally to disposable needleless prefilled hypodermic injectors and, more particularly, to a hypodermic injector containing a medicant ampule wherein the medicant is mixed with a high pressure propellant for injection into the body.

2. Description of the Prior Art

Numerous structures in the prior art disclose the concept of a needleless hypodermic injector for expelling medicant at high velocity from an orifice so that the medicant may pierce the skin to underlying tissues. A high pressure gas at approximately 400 pounds per square unit is used to propel the medicant without coming in direct contact with the medicant. Some of the prior art patents are as follows: Lockhart 2,322,245; Smoot 2,547,009; Lawshe et al. 2,645,223; and Morando 3,115,133. The use of needleless hypodermic injectors by the armed services of the United States is also well-known, but such injectors require extensive equipment to provide the medicant propellant and are not known to be portable nor intended to be disposable after an injection.

SUMMARY OF THE INVENTION

In general terms, it is an objective of the present invention to provide a compact, needleless, hypodermic injector for propelling a medicant at high pressure to pierce the skin to underlying tissues, and wherein the hypodermic injector is readily disposable. Specifically, by way of example, a pressurized ampule of medicant is contained within the body of a needleless hypodermic injector so that puncturing of the pressurized ampule of medicant allows the pressurized medicant to pierce the skin to underlying tissues. Having discharged the ampule of medicant, the injector may be thrown away.

Thus, a single simple hypodermic injector is used for only a single injection thereby conveniently eliminating any need for cleaning the injector, nor is there any problem of clogging from frequent use of an injector.

As indicated hereinabove, the medicant may be pressurized within an ampule or capsule for discharge of the pressurized medicant upon puncture or otherwise rupturing the ampule or capsule. Also, it is possible that a medicant be mixed with a pressurized propellant for delivery of the medicant to the underlayers of the skin. By conveniently locating a pressurized propellant chamber and a medicant chamber within a hypodermic injector, the medicant may be mixed with the pressurized propellant for high velocity delivery through the skin to underlying tissues.

It will be appreciated that pressurized medicant can thus be simply and compactly injected into an extremity of the body by an injector of simple manufacture and of low cost to such an extent that the entire injector can be readily disposed after each injection.

It is, of course, possible that the injector could be constructed so that ampules of pressurized medicant could be replaced after each ampule is punctured during an injection of the pressurized medicant.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

BRIEF DESCRIPTION OF THE DRAWINGS

FIG. 1 is a sectional view of the hypodermic injector of this invention;

FIG. 2 is a sectional view of a modification of this invention; and

FIG. 3 is a sectional view of another modification of this invention.

DESCRIPTION OF THE PREFERRED EMBODIMENT

Referring specifically to FIG. 1, a needleless disposable hypodermic injector is designated generally by the numeral 10. The injector 10 consists essentially of a cylindrical tube 11 having a cylindrical end piece 12 secured to said tube at one end thereof. The tube and end piece may be constructed of aluminum, stainless steel, or of a plastic material of sufficient strength to afford the rigidity necessary to effectuate a needleless injection.

End piece 12 is provided with an opening 13 to receive a plunger 14 therethrough. For convenience, the plunger 14 is provided with a head 15. The plunger 14 extends inwardly of cylindrical tube 11 to engage an ampule 16 of medicant under high pressure; for example, 400 pounds per square inch. In the preferred embodiment, the ampule 16 is provided with a puncturable membrane 17 located coaxially of opening 13.

Enclosing the other end of tube 11 is a pad 18 having a cannula 19 longitudinally therethrough, and projecting beyond the inner face 20 of pad 18 and positioned so that the sharp end 21 will puncture membrane 17 when the ampule 16 is moved against end 21 by thumb pressure acting on head 15 of plunger 14.

The pad 18 may be constructed from a resilient material such as rubber or other material insertable within the end of tube 11 after placement of the ampule 16 within the cylindrical tube 11. The end of pad 18 is preferably slightly rounded to facilitate non-abrasive contact with the skin.

The ampule 16 is constructed of plastic or other material to withstand the high pressure medicant therein. The ampule of medicine is charged to a high pressure (i.e., 400 psi) by a non-toxic gas such as carbon dioxide, and the ampule is press-fitted within tube 11 so that it will move only by thumb pressure on the plunger 14. A carbon dioxide propellant is harmless to body tissue and dissipates rapidly by normal diffusion as does intrinsically generated carbon dioxide. The ampule 16 is located within tube 11 sufficient distance from the sharp end 21 of cannula 19 so that membrane 17 is not inadvertently punctured prior to an actual injection.

In operation, the injector 10 is held in one hand with the thumb located on head 15. By applying pressure on the head 15, the plunger 14 moves the ampule 16 toward cannula 19 until the membrane 17 is punctured by sharp end 21. Medicine under high pressure is thus released through cannula 19 to pierce the skin at high velocity to underlying tissues. The ampule 16 is thus emptied of medicine, and the injector 10 may be thrown away.

Reference is now made to FIG. 2 wherein an ampule 25 of medicine is shown within cylindrical tube 11 and engageable by plunger 14. Projecting from ampule 25 is a cannula 26 in communication with the medicine within ampule 25. A thin membrane 27 prevents medicine from leaking through the cannula 26.

Also located within tube 11 is a capsule 28 filled with a non-toxic gas under high pressure (400 psi). The capsule 28 is provided with a membrane 30 and an opening 29 therethrough to permit cannula 19 in pad 18 to pass therethrough. Accordingly, capsule 28 may be a doughnut shaped chamber.

The ampule 25 and its cannula 26 is positioned within tube 11 so that cannula 26 will puncture membrane 30 to allow the pressurized gas within capsule 28 to mix with the medicine in ampule 25, thus pressurizing the medicine. By puncturing membrane 31 with cannula 19, the pressurized medicine from ampule 25 flows at high velocity through cannula 19 to pierce the skin to underlying tissues. The puncturing of the membranes 30 and 31 can occur almost simultaneously, for the high pressure gas mixes rapidly with the medicine in ampule 25, or in sequence whereby membrane 30 is ruptured first.

In operation, thumb pressure on head 15 moves ampule 25 until cannula 26 punctures membrane 30 to allow high pressure gas to flow through cannula 26 to remove membrane 27 so that the gas and medicine mix within ampule 25. Continued movement of the plunger causes cannula 19 to puncture membrane 31 to allow the pressurized medicine in ampule 25 to flow at high velocity through cannula 19 to pierce the skin for the injection of the pressurized medicine.

In the modification disclosed in FIG. 3, an ampule 40 having a medicant chamber 41 and a high pressure gas chamber 42 is located interiorly of tube 11 so that the ampule can be acted upon by plunger 14. A partition member 43 separates the gas chamber 42 from medicant chamber 41, and the partition is provided with a membrane 44 capable of withstanding the high pressure within chamber 42. The end portion 45 of the ampule 40 is provided with a membrane 46 substantially aligned with membrane 44, and the end portion 45 is also provided with another membrane 47 located so that it can be punctured by sharp end 21 of cannula 19, as will be described hereinafter.

The pad 18 is provided with a piercing shaft 48 projecting from the face 20 and located so that membranes 46 and 44 can be punctured as will be described hereinafter. The shaft 48, which is substantially the same diameter as membrane 46, is provided with a channel 49 extending from the periphery of the shaft to the sharp end 50 to allow high pressure gas to flow in the channel from chamber 42 to chamber 41 when membrane 44 has been punctured by the shaft 48. The shaft 48 extends beyond face 20 a greater extent than does cannula 19 so that membranes 46, 44 are punctured by shaft 48 prior to the puncturing of membrane 47 by sharp end 21 of cannula 19.

In operation, pressure is applied to plunger 14 in a manner hereinabove described, and ampule 40 is moved along the inner periphery of tube 11. At a predetermined location within the tube 11, membrane 46 will be punctured by shaft 48. Continued movement of the ampule 40 will then cause membrane 44 to be punctured by the shaft 48, and high pressure gas (400 psi) will flow through channel 49 to pressurize the medicant in chamber 41. As the ampule continues to move by continued pressure on plunger 14, the cannula 19 will puncture membrane 47, thus allowing the pressurized medicant within ampule 40 to flow at high velocity through cannula 19 to pierce the skin to underlying tissues.

Thus, another modification has been described wherein high pressure gas is allowed to pressurize the medicant within an ampule, and a high velocity injection is made with the pressurized medicant, and the injector may be disposed after the injection.

It should be noted that while a plunger has been shown and described as the movant for the ampule, it would also be possible to have other means of moving the ampule against the cannulae described for releasing pressurized medicant. Thus, although details of the disposable needleless hypodermic injector can be changed from those specifically shown and described, such description is not to be construed as limiting and the actual scope of the invention is found by referring to the appended claims.

While the above description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

I claim:

1. A needleless hypodermic injector comprising the combination of:
    a casing;
    an ampule of medicant located within said casing;
    a container of high pressure propellant also located within said casing, at least one of said ampule and said container being slidably disposed within said casing for relative motion with respect to the other;
    means for mixing said high pressure propellant with said medicant to pressurize said medicant for needleless injection; and
    means for discharging said pressurized medicant at high velocity for injection thereof to underlying tissues.

2. The apparatus of claim 1 wherein said ampule of medicant is provided with a cannula for entering said container of high pressure propellant, said container being provided with a puncturable portion to be punctured by said cannula to allow said high pressure propellant to flow through said cannula to pressurize the medicant within said ampule.

3. The apparatus of claim 2 wherein said ampule is provided with a puncturable portion that is punctured by said means for discharging said pressurized medicant.

4. A hypodermic injector comprising:
    a casing;
    an ampule of medicant located within said casing, said ampule having a first puncturable portion and a first cannula;
    a container of high pressure propellant located also within said casing, said container having a second puncturable portion disposed in puncturable registry with said first cannula;
    means for moving said first ampule and said second puncturable portion into puncturable engagement to allow said high pressure to flow through said first cannula to pressurize the medicant within said ampule; and
    means for discharging said pressurized medicant in puncturable registry with said first puncturable portion for discharging said pressurized medicant at high velocity for injection thereof to underlying tissues.

5. The apparatus of claim 4 wherein said means for moving also positions said ampule for discharge of said pressurized medicant.

6. A hypodermic injector comprising the combination of:
    a casing;
    an ampule slidably disposed within said casing, said ampule having a high pressure propellant chamber and a medicant chamber separated by a partition;
    a puncturable membrane located in said partition to allow mixing of the medicant and high pressure propellant when said membrane is punctured;
    means mounted within said casing for puncturing said membrane; and
    means for discharging said medicant mixed with high pressure propellant so that the pressurized medicant is released from the injector at high velocity for skin penetration.

7. The apparatus of claim 6 including a means for positioning said ampule so that the high pressure propellant is mixed with said medicant prior to discharge of pressurized medicant from said injector.

8. A hypodermic injector comprising:
    a casing;
    an ampule located within said casing, said ampule having a high pressure propellant chamber and a medicant chamber which are separated by a first puncturable membrane for allowing mixing of the high pressure propellant and the medicant when said first membrane is punctured, said ampule having a second puncturable membrane aligned with said first puncturable membrane for puncture by a first means and a third puncturable membrane for puncture by a second means;
    first means mounted within said casing for puncturing said first and second membranes to mix said high pressure propellant with said medicant and form a pressurized medicant; and
    second means mounted within said casing for puncturing said third membrane, after formation of said pressurized medicant, for discharging said pressurized medicant from the injector at a high velocity for skin penetration.

9. The apparatus of claim 8 wherein said means mounted within said casing for puncturing said first and second membranes is provided with a channel for communicating said high pressure propellant to said medicant chamber while sealing said medicant chamber at said first membrane.